Aug. 18, 1953     O. E. HINTZ     2,648,941
GATHERER FOR FORAGE HARVESTERS
Filed Nov. 2, 1951     4 Sheets-Sheet 1

Inventor:
Otto E. Hintz
By: Paul O. Pippel
Attorney

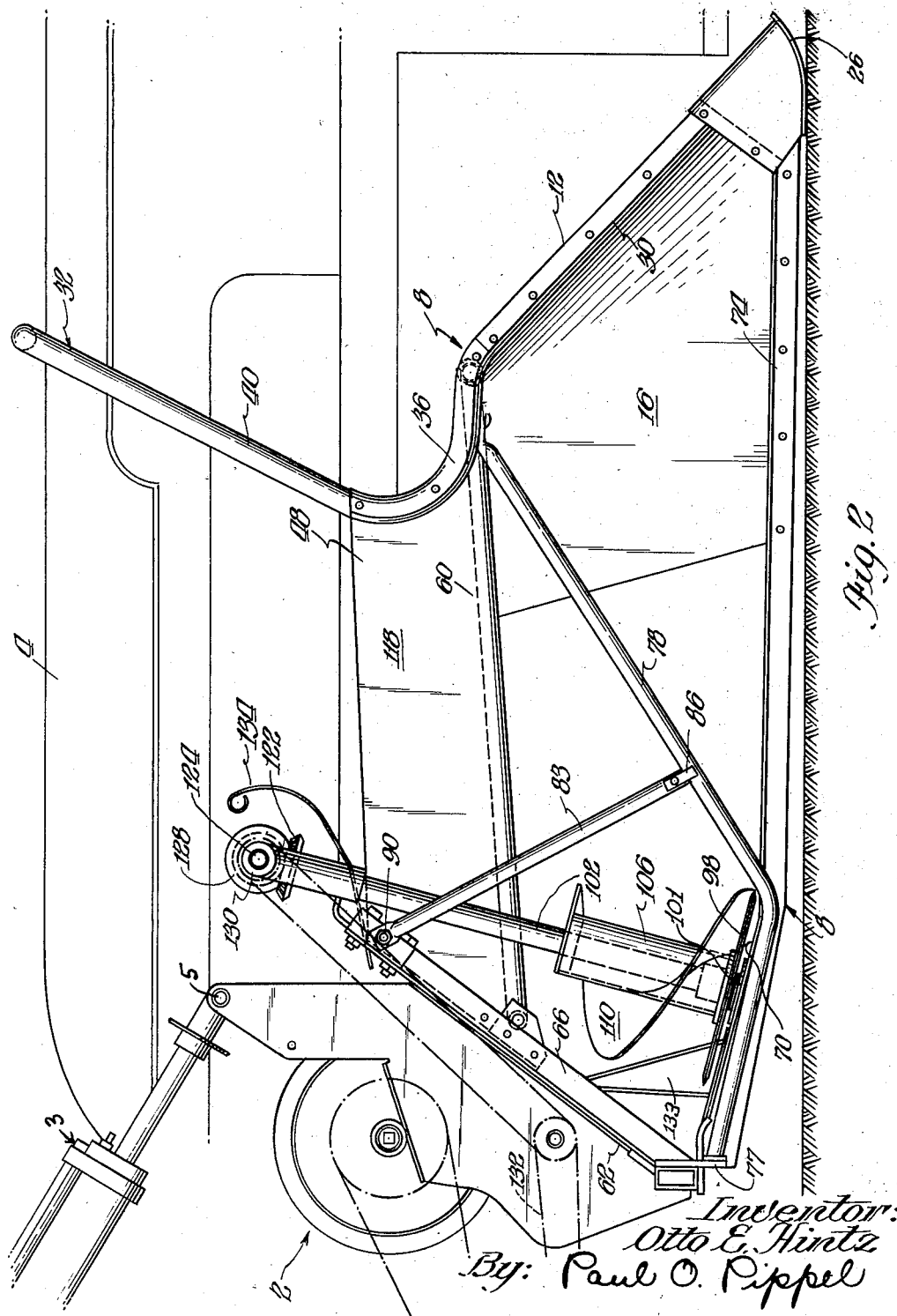

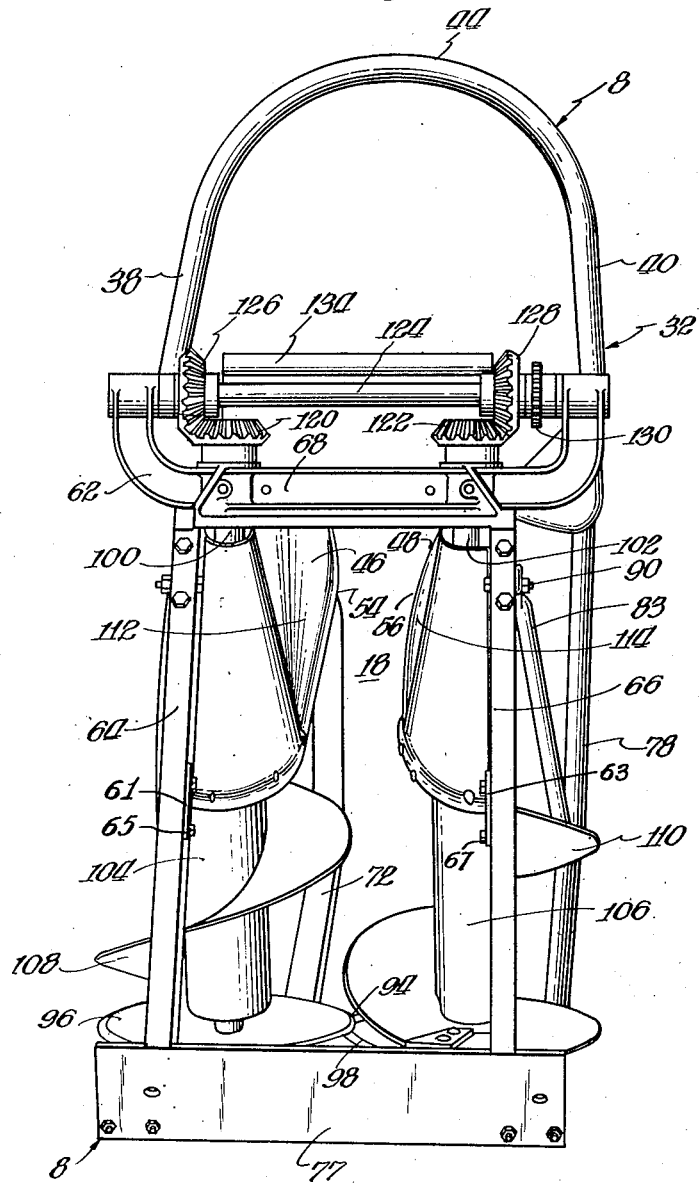

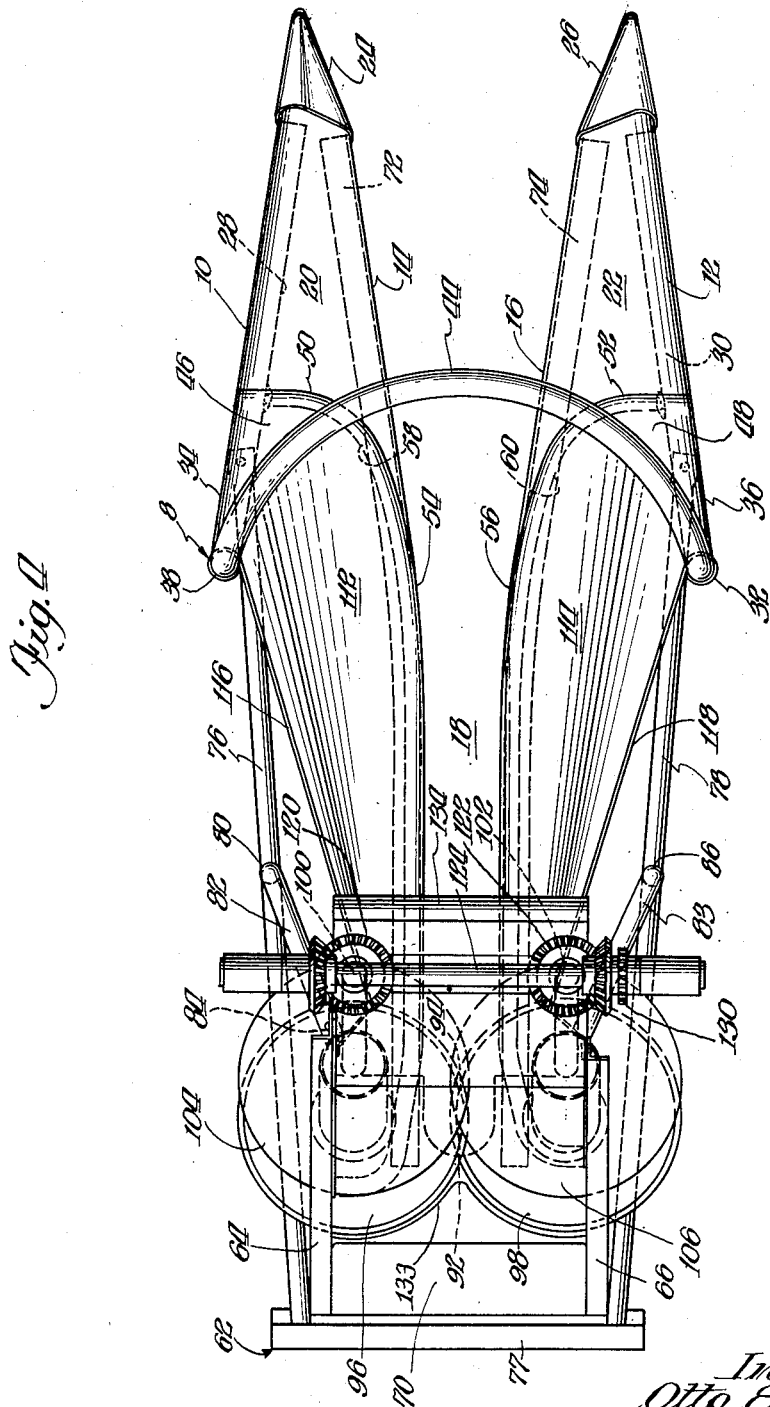

Patented Aug. 18, 1953

2,648,941

UNITED STATES PATENT OFFICE 2,648,941

GATHERER FOR FORAGE HARVESTERS

Otto E. Hintz, Riverside, Ill., assignor to International Harvester Company, a corporation of New Jersey Application November 2, 1951, Serial No. 254,491

10 Claims. (Cl. 56—15)

This invention relates to forage harvesters and more specifically to a corn harvester and is an improvement in the design shown in my copending application Serial No. 213,398 for Stalk Crop Harvester filed on March 1, 1951, now Patent No. 2,634,569.

A general object of the invention is to provide a novel gatherer with improved operating characteristics and of sufficient rigidity to withstand the abuse encountered in service.

A further object is to provide a gatherer which will effectively lift fallen stalks and efficiently guide the stalks to the severing means with minimum loss of ears or foliage.

A more specific object of the invention is to devise a gatherer which incorporates a pair of laterally spaced dividers formed with novel guide surfaces on their leading edges which are inclined upwardly rearwardly from the pointed forward ends of the dividers and at their upper rear ends merge into the forward extremities of ear and foliage catching and guiding surfaces which are disposed at opposite sides of a plant passageway through the gatherer, these last mentioned surfaces being adapted to channel the deposits thereon into the processing mechanism which is located rearwardly of the gatherer.

A more specific object is to devise the plant lifting surfaces on the dividers in the form of conical segments with their base ends disposed at their upper rear extremities and leading into the base ends of the forward extremities of the top guide surfaces which are also formed substantially as conical segments, the apices of the top guide surfaces being disposed to discharge into conveying means whereupon the crop may be delivered to the processing mechanism.

The invention contemplates the provision of cutter means at the rear extremities of the gatherer for cutting off the stalks from the roots while the stalks are partially prostrated by the gatherer, the cutting means being disposed at the lower ends of a pair of cooperating augers which are designed to lift the butt ends of the plants while the remainder of the plant is supported from the laterally disposed guide surfaces at opposite sides of the plant passageway, the augers being further adapted to deliver to conveying means picking up therefrom for delivery to the processing mechanism.

A still further object is to arrange the terminus of the top guide surfaces immediately above the upper end of the plant elevating augers and to orient their flights to present rearwardly and upwardly facing batting surfaces to glance the material descending thereon from the guide surfaces into the processing mechanism.

A different object is to provide a novel skeletal framework for the gatherer and to arrange the framework in such manner that the members thereof do not interfere with the operation of the unit and at the same time provide sufficient rigidity with minimum weight.

These and other objects of the invention will become more apparent from the specification and the drawings wherein:

Figure 2 is a fragmentary side elevational view of the harvester shown mounted on the tractor.

Figure 3 is a perspective rear end view of Figure 2; and

Figure 4 is a top plan view thereof.

Figure 1:
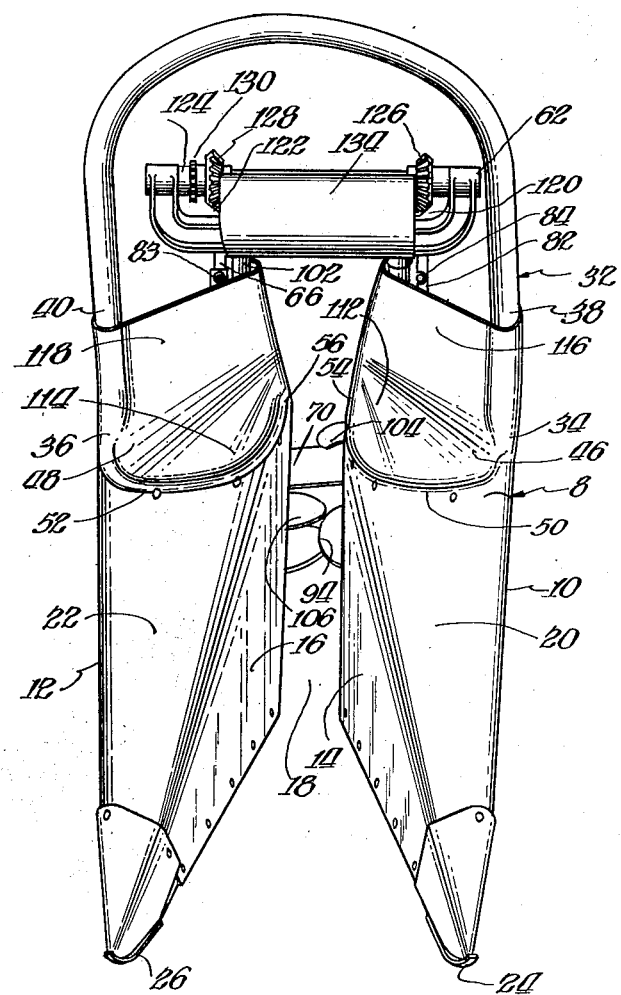
Figure 1 is a perspective front end view of a harvesting machine gatherer incorporating the invention.

In various views parts may be omitted to clarify the illustration.

Describing the invention in detail, the harvesting unit generally designated 2 is supported from one side of a tractor 4 and carried in part in conventional manner from a rear axle housing between the body of the tractor and a laterally offset driving wheel thereof as will be readily understood by those skilled in the art and is vertically positioned by an hydraulic system 3 connected at 5 to an upstanding part thereof as shown and explained in the beforementioned patent application now Patent No. 2,634,569.

The unit 2 includes a forward plant positioning support and guide structure 8 including a pair of laterally spaced divider units 10 and 12 which on their inner sides are provided with substantially vertical panels 14 and 16, respectively, and which converge rearwardly into a throat or plant passageway 18. The forward extents of the panels 14 and 16 are outturned to form substantially conical segments 20 and 22, respectively, each segment being bowed forwardly and having its narrow end at the forward end of the structure. The bottom sides of the forward pointed ends of the dividers are provided with ground engaging runners 24 and 26, respectively, for supporting the structure from the ground.

The segments 20 and 22 are wrapped at their outer edges about forwardly diagonally downwardly extending legs 28 and 30 of an arch bar or plant deflector 32. The legs 28 and 30 are coextensive longitudinally with the respective segments 20 and 22 and at their upper rear extremities are each bent rearwardly to form a generally horizontal segment 34 or 36, respectively, the rear extremity of each segment 34 and 36 being reversely bent upwardly forwardly and continuing as legs 38 and 40 of the inverted U-shaped plant deflector 32, the upper ends of the legs 38 and 40 merging into the opposite ends of a cross bar 44 which is spaced vertically above the passageway 18 and extends thereacross.

The upper extents of the sections 20 and 22 merge into the forward edges of trays 46 and 48 which are disposed at opposite sides of the plant passage 18. It will be seen that the trays 46 and 48 are concaved downwardly and that the outboard forward portion of the tray 46 is wrapped about and connected to the segment 34 and the lower part of the leg 38 extending therefrom. Similarly, the tray 48 at the outboard portion of its forward edge is wrapped about and connected to the segment 36 and the lower extremity of the leg 40. The inner edge of the tray 46 is connected to the upper edge of the panel 14 and the inboard edge of the tray 48 is connected to the upper edge of the panel 16.

The forward edges of the trays 48 and 46 are convexed forwardly in a substantially horizontal plane to provide rearwardly converging curving guide surfaces 50 and 52 respectively which continue as generally parallel guide areas 54 and 56 along the upper extremity of the plant passageway 18. The rigidity of these guide areas and sections is established by means of brace members 58 and 60. The brace member 58 is weld connected at its forward end to the inboard side of the leg 28 at the juncture thereof with the segment 34 and extending inboardly from the leg 28 along the back side of the guide area 50 and at the inboard extremity of the guide area 50 being bent back rearwardly and extending behind the area 54 and continuing along the inboard edge of the tray 46 and connected thereto and coextensive therewith longitudinally. Similarly, the guide areas at the opposite side of the gatherer are reinforced by the brace member 60 which at its forward end is weld connected to the inboard side of the leg 30 at its juncture with the segment 36 thereof, the brace member 60 continuing inboardly of the leg 30 and continuing for the full extent of the guide surface 52 in back thereof and then being bent rearwardly to parallel the guide surface 56 along the inboard edge of the tray 48 and connected thereto. The member 60 extends to the rear extremity of the tray 48.

The rear end of the structure 8 is formed with a mounting framework generally designated 62, the framework including a pair of side beams 64 and 66 which at their upper ends are interconnected by a cross beam 68 and at their lower ends by a transverse mounting plate assembly 70. It will be seen that the rear extremities of the members 58 and 60 are bent outwardly and are provided with integral brackets 61 and 63 connected to the respective beams 64 and 66 intermediate the ends thereof as by bolts 65, 67.

The lower edges of the dividers 10 and 12 are reinforced by beams 72 and 74, respectively. The beam 72 is connected at its forward end to the runner 24 and then parallels the panel 14 along its lower edge and is connected thereto. The panel 14 terminates at its rear edge intermediate the ends of the passageway 18 and the member 72 extends rearwardly thereof generally parallel to the line of draft of the unit and at its rear end is connected to the forward edge of the mounting plate 70. This extent of the beam 72 rearwardly of the panel 14 defines one side of the lower edge of plant passageway 18. Similarly, the beam member 74 has a forward portion which at its front end is connected to the runner 26 and parallels the panel 16 and is connected to the lower edge thereof. Panel 16 terminates at its rear edge substantially even with rear edge of the panel 14 and the rear extent of the beam 74 parallels the rear extent of the member 72 along the opposite side of the passageway 18 defining the lower portion thereof and the rear extremity of the beam 74 is connected to the forward portion of the beam 77.

Each side of the gatherer is additionally reinforced by longitudinally extending brace members 76 and 78, the member 76 having its forward end connected to the underside of the segment 34 and then sloping downwardly rearwardly to the forward edge of the mounting plate 70 and then parallels the adjacent lateral edge thereof and is connected at its rear extremity to the adjacent end of a transverse bar 77 which is positioned along the rear edge of the plate 70 and interconnects the lower extremities of the beam members 64 and 66 of the mounting frame 62. The beam member 76 is connected on its top side intermediate its ends as at 80 to the lower end of an auxiliary brace 82 which extends upwardly diagonally rearwardly and connected at its upper end to the beam member 64 adjacent the upper end thereof as at 84. The brace member 78 is connected at its forward end to the under side of the segment 36 and then extends downwardly diagonally rearwardly thereof to the forward extremity of the mounting plate 70 and then parallel the adjacent lateral edge thereof and at its rear extremities is connected to the adjacent end of the bar member 77. The brace 78 is connected intermediate its ends as at 86 to the lower end of an auxiliary brace 83 which extends upwardly diagonally rearwardly and its upper end is connected as at 90 to the adjacent beam member 66 close to the upper end thereof.

The plate member 70 is cut out at its forward end to provide a plant entry notch 92 longitudinally in alinement with the plant passageway, the notch being in vertical alinement with the cutting zone 94 defined between a pair of cutting disks 96 and 98.

The cutting discs are connected to shafts 100 and 102, respectively, which at their lower ends are each suitably journaled in a bearing 101 the mounting plate 70 at the sides of the notch 92. Upstanding augers 104 and 106 are connected to shafts 100 and 102 above the cutter disks 96 and 98, said augers extending up to the undersides of the tray 46 and 48 respectively. The augers 104 and 106 are provided with intercalating flights or helicoids 108 and 110, said flights being arranged with their top sides facing upwardly and rearwardly into the processing component of the unit (not shown). This feature obtains a directional effect on the ears of corn and other pieces of stalk or foliage which drop from the trays so that the same are batted rearwardly into the processing conveyor. It will be noted that the focus or apices at the rear ends of the guide surfaces of the trays 46 and 48 are disposed above the respective augers. Thus any plant matter which is carried on the bottom sections 112 and 114 of the respective trays 46 and 48 are continuously being shifted laterally inwardly by the rearwardly converging upstanding segments 116 and 118 at the lateral outer edges of the respective trays 46 and 48. The inner extremities of the sections 116 and 118 sweep around the inner sides of the respective shafts and continue outboardly around the back sides thereof and are connected to the respective beams 64 and 66 of the mounting frame.

The upper ends of the shafts 100 and 102 are journaled in suitable bearings through the cross-beam 68 and the upper end of shaft 100 is keyed to a bevel gear 120 and the upper end of shaft 102 is keyed to a bevel gear 122. The outer ends of the cross-beam 68 are turned upwardly and rotatably support the opposite ends of a cross shaft 124 which mounts, outboardly of the bevel gears 120 and 122, mating bevel gears 126 and 128 which are driven by the shaft 124 for rotating the shafts 100 and 102 in reverse directions to develop an intake effect on the forward side of the auger assembly for pulling the plants therebetween. The cross-shaft 124 may also mount a suitable driving member such as a sprocket 130 which may be connected through conventional chain and gearing driven from the power take-off (not shown) of the tractor or an auxiliary motor (not shown).

Inasmuch as the processing mechanism rearwardly of the gatherer is substantially similar with that shown in my before-mentioned copending application, the same will not be described in detail and it will suffice to indicate the intake of this processing mechanism provides suitable conveying means generally designated 132 leading from the upper level of the augers and feeding therefrom.

In operation unit 2 is moved by the tractor along a row of plants which are entered between the dividers and guided into the passageway. Each stalk is then successively engaged by the cross-bar and bent forwardly so as to present the butt end of the stalk first to the cutters. It will be understood that normally as each stalk is cut other plants have already entered into the passageway and provide a support therefor and deflect it into either tray. As each stalk is cut its butt end is picked up by the auger flights or helicoids and elevated while its upper extremity falls downwardly and the foliage and any ears which may have been knocked off will be deposited into the trays and due to the contour of the guiding surfaces and to the sweep of the foliage of the initial plant or succeeding plants this plant will be moved off the rear ends of the trays directly onto the auger flight which will reglance the same into the mouth of the processing mechanism. The augers sweep the plants rearwardly onto the conveyor which assists in dragging each stalk off the augers and support surfaces.

It will be noted that the lower end of the plants is guided between the parallel extension of the lower guide members 72 and 74 and that rearwardly of the augers a butt pan 133 is provided which extends from the plate 70 to the level of apron 132 and connected to plate 70 and beams 64 and 66. It will also be observed that the bracing is designed to obtain rigidity and at the same time present clean lines such as will not tangle with the foliage of the corn plants.

The cross-shaft 124 and the gearing operated thereby is shielded by a downwardly convexed plate 134 which is attached to the underside of the cross-beam 68 and extends therebeneath rearwardly thereof.

The augers rotate about upwardly forwardly inclined axes and the rear discharge extremities of the trays are above the discharge sides of the augers. Furthermore, as the stalk is being elevated it simultaneously is being engaged further along its length to insure that it will not fall out from between the augers. The elevation of each stalk keeps it out of the cutters and insures that the entire plant will be fed onto the conveyor.

What is claimed is:

1. In a plant harvester of a type having a field traversing support, a gatherer carried thereby and including laterally spaced elongated plant guides having front and rear ends and defining a plant passageway therebetween with forward and rear open extremities, each guide presenting an upwardly facing plant support surface alongside the passageway adapted to support off the ground overhanging portions of plants entered in the passageway, each surface having a rear discharge extremity at the rear extremity of the passageway plant severing and elevating means at the rear ends of said guides carried by the support and comprising a substantially upright auger at the rear extremity of each guide and having an upper end disposed beneath the rear discharge extremity of the respective surface, and cooperating cutter discs connected to the lower ends of the augers and adapted to sever plants at the ground line as they pass to the rear extremity of the passageway, said augers having flights passing each other in vertically stepped relation and adapted to receive the butt end of each plant after it is severed between the lower ends thereof and elevate the butt end of the plant to the upper ends of the augers while the upper part of the plant and foliage thereon falls upon said surfaces above said cutter discs to prevent said upper part of said plant from entering between said cutter discs, said augers rotating in directions advancing the plants engaged thereby rearwardly, and means carried by the support for removing the plants from the upper ends of said augers and dragging them off the surfaces.

2. In a plant harvester of a type having a field traversing support, a gatherer carried thereby and including laterally spaced guides with upper plant support surfaces, said guides and surfaces having front ends at one extremity and rear ends at their other extremities plant severing and elevating means at the rear ends of the guides carried by the support and including a pair of substantially upright oppositely driven augers positioned respectively with their upper ends in receiving relationship to the rear ends of respective plant support surfaces, said augers having lower ends positioned proximate to the ground cutting means operatively associated with the lower ends of said augers for severing at the ground plants entered between the guides, said augers having cooperating helicoids formed and arranged to accept between their lower ends the butt of each plant as it is severed and elevate the butt to the top ends of the augers while the upper end of the plant falls upon at least one of said surfaces whereby it is supported out of said cutting means, said augers being rotated in directions imposing a sweeping force upon the engaged plant in a rearward direction whereby when the butt end of each severed plant reaches the top ends of the augers, the plant is impelled rearwardly off said surfaces.

3. In an ensilage harvester for operating on corn, a gatherer including a pair of laterally spaced members providing a generally vertical plant passageway therebetween extending longitudinally of the gatherer and having front and rear extremities, a pair of trays forming part of respective members flanking the upper extremities of said passageway, said trays being adapted to receive dropping ears of corn and the like from the plants moving through the passageway, said trays being formed substantially as conical segments with the apices thereof at said rear extremity, the bottom sides of said trays sloping downwardly from the front toward the rear extremities, and rearward conveying means supported from the gatherer and presenting surfaces beneath the trays and projected into the passageway and disposed to pick up at the rear extremity of said passageway and the apices of said trays.

4. In a crop harvester for operating on corn, a gatherer having forward and rear extremities and including a pair of laterally spaced members defining a generally vertical plant passageway therebetween extending longitudinally of the gatherer, each member including a forward divider element with a diagonal leading side terminating in a forward pointed nose and a relatively wide upper rear end and providing a fallen stalk lifting surface sloping upwardly rearwardly from the pointed nose thereof, each member presenting a trough at the adjacent side of the passageway extending from the upper rear end of the lifting surface of the related divider to the rear extremity of the gatherer, cutter means carried by the members at the rear extremity of the gatherer projected into the passageway at the lower margin thereof, an upstanding auger carried by each member at the rear extremity of the gatherer and projected into the passageway beneath the adjacent extremity of the related trough in receiving relationship thereto, each auger having flights adapted to elevate a stalk cut by the cutter means and to draw the same rearwardly therebetween, said flights also being oriented to receive parts of the plant which may be dropped from the adjacent extremities of the troughs to bat the same rearwardly into associated receiving means.

5. In a corn ensilage harvester, a gatherer unit comprising a pair of laterally spaced members defining a plant passageway therebetween, a divider segment at one corresponding end of each member, the divider segments presenting rearwardly converging side surfaces on their adjacent sides forming a mouth of said passageway, said segments having inner ends terminating at an adjacent end of the passageway, a plant deflector having spaced portions connected to respective members and including a cross-piece disposed at a level to engage the upper portions of the plants, said cross-piece being disposed in a generally vertical transverse plane intersecting the inner extremities of said dividers, said members including trays flanking the upper edges of said passageway and disposed at a height normally below the level of the lowermost foliage of corn plants and, provided with upstanding sides along their remote edges converging toward the opposite ends of said members, means for cutting the stalks at their butt ends from the ground operatively associated with the last-mentioned ends of said members and projecting into the adjacent end of the passageway, and common conveyor means operatively associated with and disposed in receiving relationship to said cutting means and the adjacent extremities of said tray for discharging therefrom and including overlapped surfaces extending completely across the passageway at said last-mentioned ends of said members.

6. An ensilage harvester comprising a gatherer including a plurality of laterally spaced elements defining plant passage means therebetween, each element presenting an upwardly facing surface area adapted to catch plant fragments broken off plants passing through the passage means, said surface areas having discharge end at one extremity, conveying means associated with said elements and operative to receive from the discharge ends of the surface areas, said surface areas inclined downwardly toward said discharge ends and disposed at a level to be swept by the foliage of the plants passing through the passage means, said conveying means comprising driven augers disposed below the discharge ends of said surface areas in vertically overlapping relationship therewith and projecting into the passage means and adapted to feed from the plants passing through the passage means and from plant deposits descending from said surface areas.

7. In a harvester unit, a gatherer comprising a pair of laterally spaced elongated elements having forward and rear ends and defining generally vertical plant passage means therebetween, each element having a divider section at its forward end including a sheathing forming a forwardly convexed generally conical leading edge segment terminating in a forwardmost groundwardly directed apex, a ground engaging runner connected to the sheathing at said apex, the conical segment extending diagonally upwardly from the forward toward the rear end of the related element and terminating in a rear edge intermediate the ends of the element, said sheathing at said conical segment extending transversely of the associated element and terminating in inboard and outboard edges, said sheathing having a generally vertical portion continued rearwardly from the inboard edge and positioned at an acute included angle with the longitudinal vertical plane of the passage means, the vertical portions of the sheathing of respective dividers opposing each other and defining the forward end of the passage means, a brace member extending along the lower edge of each sheathing and having a forward section paralleling the same and connected thereto and to the associated runner, each brace member having an intermediate section running along and defining the lower edge of the passage means generally parallel thereto, a tray at each side of the passage means and defining the upper margin thereof, each tray elongated lengthwise of the associated element and having forward and rear edge portions and having its forward edge connected to the upper rear edge of the related conical segment of the sheathing, a deflector bar arched over the passage means and including an upper cross-bar disposed crosswise above the forward end of the passage means and having a pair of depending legs at opposite ends, the legs having upper portions angled downwardly rearwardly from the cross-bar and having intermediate portions connected to the remote margins of the forward end portions of the trays, said intermediate portions of the legs extending forwardly generally horizontally, said legs having lower portions sloping downwardly forwardly from said intermediate portions beneath the outboard edges of the conical segments of the respective dividers and connected thereto, said lower portions of the leg having lower ends connected to respective runners, each tray sloping downwardly rearwardly from its forward to its rear edges for gravitating crops deposited thereon rearwardly, said trays having upstanding sides at their remote edges arranged in converging relationship toward the rear ends of the trays and adapted to funnel the crops to the portion of said passage means at said rear ends to associated receiving means.

8. In a harvester, a support structure including a pair of laterally spaced components defining a plant passageway therebetween having a forward intake end and a rear discharge end, each component providing a tray along the adjacent side of the passageway for supporting fragments broken off the plants passing through the passageway, the trays being substantially coextensive longitudinally with said passageway, elevating and conveying means carried by the support structure and including an auger at each side of the rear end of the passageway and projecting thereinto, cutter means operatively associated with the lower ends of the augers for cutting off the plants at the roots when they reach the rear end of the passageway, said augers positioned and rotating on axes sloping diagonally upwardly forwardly from said rear end of the passageway and provided with flights oriented to rearwardly glance plant fragments descending thereon from the adjacent ends of the trays and elevate the severed ends of the plants off the ground and out of the cutter means and impel the same rearwardly.

9. In a harvester of a type having a field traversing support, a gatherer carried thereby, said gatherer including a pair of laterally spaced members defining a generally vertical plant passageway therebetween and having front and rear ends, plant elevating means carried at the rear ends of said members and comprising a pair of side-by-side substantially upright oppositely driven augers, cutter means mounted on the lower ends of the augers, each member having a plant supporting slide surface flanking the upper margin of the passageway and extending to the rear end of the passageway and terminating above the upper end of an adjacent auger, a plant deflector associated with said members and positioned across said passageway a substantial distance above the upper margin thereof and adapted to forwardly deflect the upper extent of each plant passing through the passageway with the foliage of the plant overhanging and in supported relationship with said surfaces at the upper margin of the passageway whereby the butt of the plant is presented butt first to the cutter means while the plant is partially prostrated, said augers having cooperating flights adapted to receive the butt of each plant as it is severed and elevate it to the upper ends of the augers while rotating the plant to a substantially horizontal position initially about the deflector until the plant drops onto said surfaces and then about points at which the plant is caught between said surfaces whereby the butt of the plant is swung upwardly while it is being elevated and sliding rearwardly between the augers, said augers rotating in directions from front to rear along adjacent edges and effective upon elevating each plant to their upper ends to impel the plant rearwardly.

10. In a forage gatherer, a pair of laterally spaced members forming a generally vertical plant passageway therebetween and providing a pair of trays elongated longitudinally thereof and having forward and rear extremities and positioned side by side in flanking relationship to said passageway along the upper edge thereof, each tray having a downwardly bowed bottom and an outboard upstanding side, the upstanding side of each tray being angled rearwardly to reduce the lateral extent of the bottom of the tray toward the rear extremity thereof, said passage having a discharge end at the rear extremities of said trays, and common conveying means carried by said members at the discharge end of the passageway in receiving relationship thereto and to the rear extremities of said trays.

OTTO E. HINTZ.

References Cited in the file of this patent

UNITED STATES PATENTS

| Number | Name | Date |
|---|---|---|
| 432,650 | Terman | July 22, 1890 |
| 1,165,758 | Cooke | Dec. 28, 1915 |
| 1,975,089 | Falkiner et al. | Oct. 2, 1934 |
| 2,004,720 | Coultas et al. | June 11, 1935 |
| 2,427,861 | Johnson | Sept. 23, 1947 |
| 2,442,520 | Van Sickle | June 1, 1948 |
| 2,456,404 | Good | Dec. 14, 1948 |
| 2,527,802 | Dwyer | Oct. 31, 1950 |
| 2,634,569 | Raney et al. | Apr. 14, 1953 |